(12) United States Patent
Grandin et al.

(10) Patent No.: US 9,846,221 B2
(45) Date of Patent: Dec. 19, 2017

(54) METHOD FOR THE PASSIVE LOCALIZATION OF RADAR TRANSMITTERS

(71) Applicant: THALES, Courbevoie (FR)

(72) Inventors: Jean-François Grandin, Elancourt (FR); Laurent Ratton, Elancourt (FR); Raphaël Sperling, Elancourt (FR)

(73) Assignee: THALES, Courbevoie (FR)

( * ) Notice: Subject to any disclaimer, the term of this patent is extended or adjusted under 35 U.S.C. 154(b) by 458 days.

(21) Appl. No.: 14/650,014

(22) PCT Filed: Nov. 29, 2013

(86) PCT No.: PCT/EP2013/075160
§ 371 (c)(1),
(2) Date: Sep. 10, 2015

(87) PCT Pub. No.: WO2014/086688
PCT Pub. Date: Jun. 12, 2014

(65) Prior Publication Data
US 2016/0041254 A1 Feb. 11, 2016

(30) Foreign Application Priority Data
Dec. 7, 2012 (FR) ...................... 12 03322

(51) Int. Cl.
*G01S 5/06* (2006.01)
*G01S 5/12* (2006.01)
(Continued)

(52) U.S. Cl.
CPC ................ *G01S 5/12* (2013.01); *G01S 3/043* (2013.01); *G01S 3/72* (2013.01); *G01S 5/0221* (2013.01);
(Continued)

(58) Field of Classification Search
CPC ... G01S 5/12; G01S 3/043; G01S 3/72; G01S 5/0221; G01S 5/0278; G01S 5/04; G01S 5/14
(Continued)

(56) References Cited

U.S. PATENT DOCUMENTS 2,480,123 A * 8/1949 Adams ...................... G01S 1/02
342/180
4,670,757 A * 6/1987 Munich ................. G01S 13/003
342/450

(Continued)

FOREIGN PATENT DOCUMENTS

| EP | 2 270 537 A1 | 1/2011 | |
|----|----|----|----|
| EP | 2270537 A1 * | 1/2011 | ........... G01S 5/0268 |
| WO | WO-2007142532 A1 * | 12/2007 | ............... G01S 5/04 |

*Primary Examiner* — Bernarr E Gregory
*Assistant Examiner* — Nuzhat Pervin
(74) *Attorney, Agent, or Firm* — Baker & Hostetler LLP

(57) ABSTRACT

A method of passive location of radar transmitters implemented by at least two ESM stations, the radars having a quasi-constant scanning speed in the course of the transit over the set comprising at least two ESM stations, each of the ESM stations being able to intercept the transmission lobes of radar transmitters and to estimate their lobe transit times (LTT) and at least one station being able to estimate the angle of arrival α of the transmission lobes, the location of the radar transmitters being performed by testing the intersection between an iso-LTTD curve passing through at least the two ESM stations and a sighting straight line passing through the ESM station having measured the angle of arrival and of azimuth equal to the measured angle of arrival α.

9 Claims, 5 Drawing Sheets

(51) Int. Cl.
*G01S 3/72* (2006.01)
*G01S 5/02* (2010.01)
*G01S 5/04* (2006.01)
*G01S 5/14* (2006.01)
*G01S 3/04* (2006.01)

(52) U.S. Cl.
CPC .............. *G01S 5/0278* (2013.01); *G01S 5/04* (2013.01); *G01S 5/14* (2013.01)

(58) Field of Classification Search
USPC ........................................................ 342/465
See application file for complete search history.

(56) References Cited

U.S. PATENT DOCUMENTS

| | | | | |
|---|---|---|---|---|
| 5,252,980 A | * | 10/1993 | Gray | G01S 13/003 342/107 |
| 5,327,145 A | * | 7/1994 | Jelinek | G01S 5/10 342/126 |
| 5,434,570 A | * | 7/1995 | Wurman | G01S 13/003 342/104 |
| 5,448,243 A | * | 9/1995 | Bethke | G01S 13/87 342/29 |
| 5,537,117 A | * | 7/1996 | Rose | G01S 7/36 342/17 |
| 5,614,912 A | * | 3/1997 | Mitchell | G01S 13/003 342/146 |
| 5,999,129 A | * | 12/1999 | Rose | G01S 5/12 342/387 |
| 6,377,214 B1 | * | 4/2002 | Melville, II | G01S 3/48 342/156 |
| 8,013,782 B2 | * | 9/2011 | Våland | G01S 7/021 342/13 |
| 2007/0247368 A1 | * | 10/2007 | Wu | G01S 5/0221 342/465 |
| 2009/0109082 A1 | * | 4/2009 | Rose | G01S 3/46 342/89 |
| 2010/0204867 A1 | * | 8/2010 | Longstaff | G01S 13/003 701/26 |
| 2010/0309055 A1 | * | 12/2010 | Middour | G01S 5/12 342/417 |
| 2010/0321239 A1 | * | 12/2010 | Rossi | G01S 5/0268 342/387 |

* cited by examiner

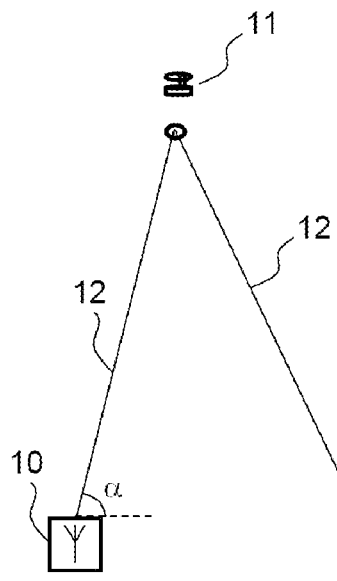
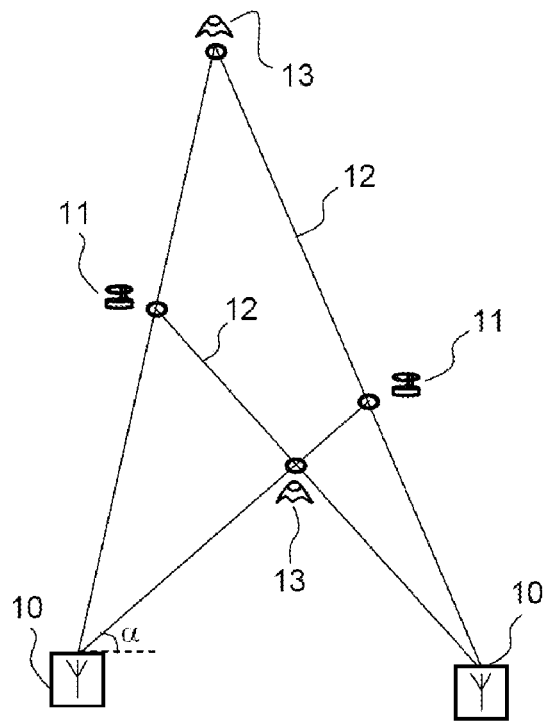
FIG.1a  FIG.1b
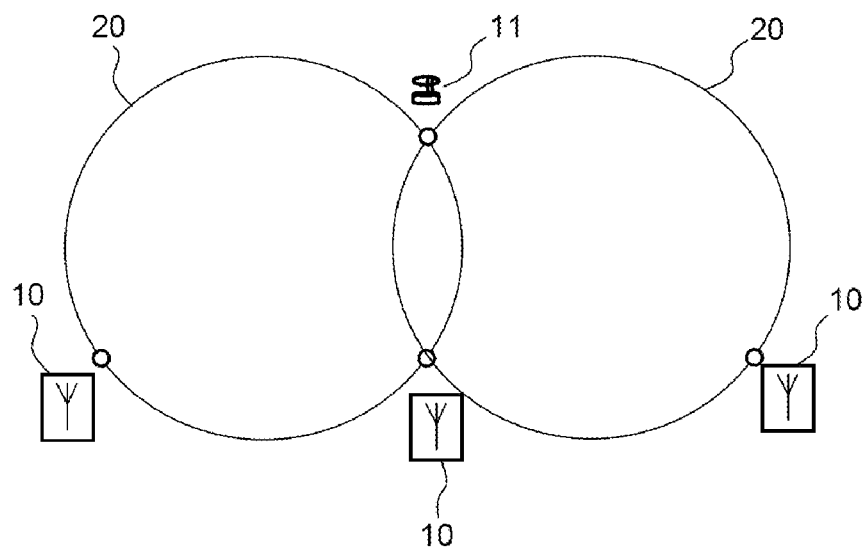
FIG.2

METHOD FOR THE PASSIVE LOCALIZATION OF RADAR TRANSMITTERS

CROSS-REFERENCE TO RELATED APPLICATIONS

This application is a National Stage of International patent application PCT/EP2013/075160, filed on Nov. 29, 2013, which claims priority to foreign French patent application No. FR 1203322, filed on Dec. 7, 2012, the disclosures of which are incorporated by reference in their entirety.

FIELD OF THE INVENTION

The present invention relates to the field of the passive detection of radar transmissions. The present invention relates more particularly to a method for locating radar transmitters of the quasi-constant scanning type and an associated system.

BACKGROUND

The aim of passive detection and location systems is to detect the radiation of transmitters, locate them, and to determine their technical characteristics so as to facilitate their identification. Their basic principle is to determine the positioning of the transmitters by using the information provided by their transmission.

Passive detection and location techniques generally implement the principle of triangulation between sighting lines using several goniometric measurements of radiations transmitted by the radar transmitters to be located.

This triangulation scheme is a technique which gives good results on condition on the one hand that there is no ambiguity in the identification of the common point sighted, on the other hand that the geometric disposition of the listening system is sufficiently open. The problem of ambiguous association occurs when several transmitters are present in the surveillance field of the passive sensors or ESMs (Electronic Support Measures). Indeed, passive sensors, unable to measure the distance separating them from the transmitter, can only provide an angle of arrival of the intercepted wave. In this context, there then exist intersections of sighting lines not corresponding to real transmitters but to phantom or ghost sources. This phenomenon is illustrated in FIG. 1b. It is then a matter of dealing with a problem in decision theory, that is to say of devising a test making it possible to adjudicate between two complementary hypotheses, namely, do the tracks of the sensors originate from the same source or not. If only the geometric information is considered, the problem of association is then formulated based on the angle of the association of the ESM angular plots. The absence of the distance parameter makes it an "ill-posed" problem.

This problem of association of angular plots can be solved by optimization algorithms of significant computational complexity. This complexity quickly becomes crippling in dense environments of radar transmissions.

An aim of the invention is notably to correct the aforementioned drawbacks by proposing a solution making it possible to rapidly eliminate phantom or ghost sources and to associate radar tracks originating from one and the same source.

SUMMARY OF THE INVENTION

For this purpose, the subject of the invention is a method of passive location of radar transmitters implemented by at least two ESM stations, said radars having a quasi-constant scanning speed in the course of the transit over the set comprising at least two ESM stations, each of said ESM stations being able to intercept the transmission lobes of radar transmitters and to estimate their lobe transit times (LTT) and at least one station being able to estimate the angle of arrival of said transmission lobes, said location of the radar transmitters being performed by testing the intersection between an iso-LTTD curve passing through at least the two ESM stations and a sighting straight line passing through the ESM station having measured the angle of arrival and of azimuth equal to said measured angle of arrival.

According to an implementation variant, the method comprises, for each ESM station:
 a step Stp1 of detecting and tracking lobes of the radar transmitters present in the surveillance field of the ESM station considered,
 a step Stp2 of estimating, for each intercepted lobe, its angle of arrival (AOA), its lobe transit time (LTT) as well as characteristics of its waveform,
 a step Stp3 of local association of the transmission lobes originating from the transmission of the same radar transmitter,
 a step Stp4 of integrating the angles of arrival and lobe transit time of each lobe originating from the transmission of the same radar transmitter and of forming a synopsis of measurements of each radar transmitter,
 a step Stp5 of sending the synopses of measurements of each radar transmitter 11 to a computation module;
and in that it furthermore comprises a global tracking step Stp6 implemented by the computation module, said global tracking consisting in associating the integrated doublets (AOAi, LTTi) originating from one and the same transmitter by using a multi-hypothesis tree, each hypothesis being tested by a likelihood computation, and in geographically locating said radar transmitter.

According to an implementation variant, step Stp6 furthermore comprises a filtering of the hypotheses by constraints.

According to an implementation variant, the method comprises, for each ESM station:
 a step of receiving and separating the transmission lobes of the radars present in the surveillance field of the ESM station considered;
 a step of sending the data to a computation module;
 and in that it furthermore comprises a step of 2-Dimensional correlation of the data of all the ESM stations.

According to an implementation variant, step Stp6 is not carried out with a multi-hypothesis tree but by implementing a global assignment scheme.

Another aim of the invention is to propose a system for detecting radar transmitters with quasi-constant scanning able to implement the method defined above.

This aim is achieved by a detection and location system able to implement the method described above, said system comprising at least two ESM stations and a computation module, each ESM station comprising a reception module able to estimate the lobe transit time of at least one transmitter, a local tracking module, a communication module able to communicate with at least the other ESM stations and a synchronization module able to coordinate the operations of the various ESM stations of the system, the reception module of at least one ESM station being able to estimate the angle of arrival of the transmission lobe of at least one transmitter.

According to a variant embodiment the system furthermore comprises a dedicated station comprising a communication module able to communicate with the communication modules of the ESM stations and in that the computation module is situated in said dedicated station.

According to a variant embodiment the computation module is situated in one of the ESM stations of the system.

According to a variant embodiment, the synchronization module comprises a satellite geolocation receiver.

The advantage of the present invention is to allow faster and more precise location of radar transmitters of quasi-constant rotation type than with a scheme using only the angles of arrival. Moreover the method according to the invention makes it possible to eliminate ghost targets immediately.

BRIEF DESCRIPTION OF THE DRAWINGS

Other particular features and advantages of the present invention will become more clearly apparent on reading the description hereinafter, given by way of nonlimiting illustration and with reference to the appended drawings in which:

FIGS. 1a and 1b illustrate the location scheme of AOA type using only the angles of arrival;

FIG. 2 illustrates the location scheme of LTT type using only the lobe transit times;

FIG. 6 represents

DETAILED DESCRIPTION

Figure 3:
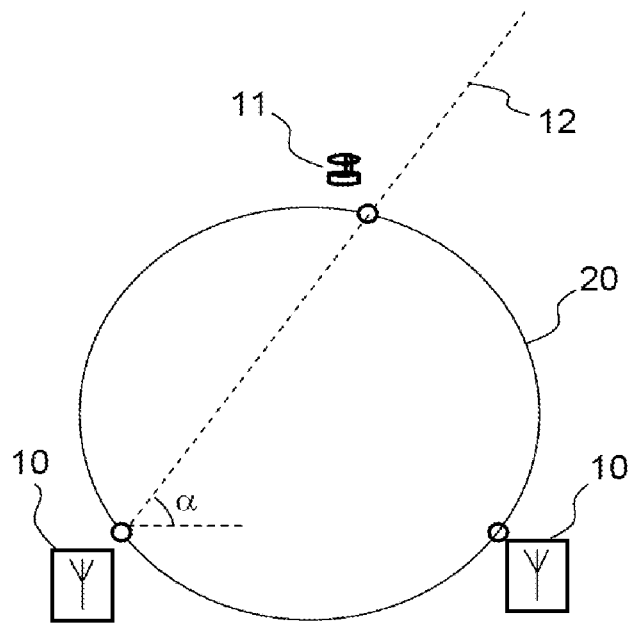
FIG. 3 illustrates the principle of location using the information regarding lobe transit times and angles of arrival with two ESM stations.

The subject of the present invention is a method of passive location of radar transmitters implemented by at least two ESM stations or bases. It will be assumed that the transmitters to be detected are of the quasi-constant scanning type.

It should be noted that the use of the term "quasi-constant scanning" refers both to constant rotation radars and to constant sequential scanning radars or indeed to any other radar whose angular scanning speed is constant "on average" in the course of the transit over the ESM receivers. Generally, this term refers to any type of radar whose scan is at constant angular speed, to within a small fluctuation, in the course of the transit over the ESM stations.

The principle of location of AOA (Angle Of Arrival) or MAOA (Multiple Angle Of Arrival) type using only the angles of arrival is illustrated in FIGS. 1a and 1b. The scheme relies on the use of the triangulation between sighting straight lines 12. It consists in computing the angle of reception α of the transmission lobe of a radar transmitter 11 to be located by at least two ESM stations 10, whose position is known, and by using this information, in positioning the radar 11 in space by estimating the convergence point.

When there is only the single a transmitter 11 to be located and the stations 10 are sufficiently distant, this scheme is fairly precise, with the proviso that the spacing between the receivers is sufficient. As explained previously, a problem arises when the number of transmitters 11 increases. Indeed, on account of the crossover of the sighting straight lines 12, phantom sources 13 or ghosts appear although no transmitter is present.

FIG. 2 illustrates the principle of location by lobe transit time difference or LTTD. It is assumed that the transmitter 11 to be located scans space at a constant rotation speed. The scheme relies on the use of the difference in the transit times of a transmission lobe of a radar transmitter 11 at the level of the ESM stations 10. It is shown that the iso-LTTD curve is a circle passing through the transmission point and the 2 ESM stations 10. The transmitter 11 can therefore be located by using at least three ESM stations 11 scanned by the beam of said transmitter 11. The location of the transmission can be obtained at the intersection of 2 iso-LTTD circles 20 each passing through two ESM stations 10.

The principle of the invention relies on the joint use of the principle of location and association of the "AOA" type and of that of the "LTTD" type.

With reference to FIG. 3, two ESM stations 10 intercept the transmission lobes of a radar transmitter 11 with quasi-constant scanning and estimates the characteristic parameters thereof. The transmitter is located by searching for the intersection of the iso-LTTD circle 20 passing through the two stations 10 and of at least one sighting straight line 12 passing through the station 10 having measured the angle of arrival of the transmission lobe and of azimuth equal to said measured angle of arrival.

In an advantageous manner, in the presence of several radar transmissions the association of the measurements of LTTD and of the AOA measurements originating from one and the same radar transmission is much easier and robust than the association with AOA only or LTTD only. Indeed it is necessary that the iso-measurement curves of "LTTD" and "AOA" type of one and the same radar transmitter all cross at one and the same point to within noise in order to validate an association, this being securer than the convergence of the iso-measurement curves of "AOA only" type or of the iso-measurement curves of "LTTD only" type.

Figure 4:
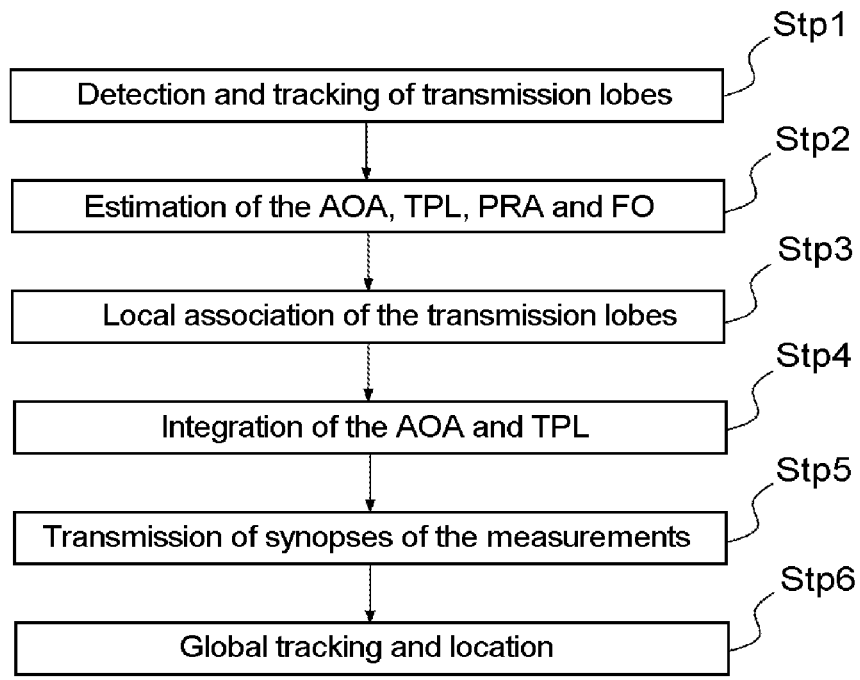
FIG. 4 represents a schematic of an exemplary implementation of the method according to the invention.

With reference to FIG. 4 the method according to the invention mainly comprises, for each ESM station, a first step Stp1 of detecting and tracking lobes of the radar transmitters 11 present in the surveillance field of the ESM station 10, a step Stp2 of estimating, for each intercepted lobe, its angle of arrival (AOA), its lobe transit time (LTT) as well as characteristics of its waveform, a step Stp3 of associating, within each ESM station 10, the successive lobes originating from the transmission of the same radar transmitter 11, a step Stp4 of integrating the angles of arrival and lobe transit time of each lobe originating from the transmission of the same radar transmitter 11, a step Stp5 of sending each triplet of measurements comprising the integrated angle of arrival (AOAi), the integrated lobe transit time (LTTi) and the antenna rotation period (ARP) as well as the waveform (WF) of each radar transmitter 11 to a computation module 75 and a global tracking step Stp6, implemented by the computation module 75. This global tracking essentially consists in associating the integrated doublets (AOAi, LTTi) sent by each ESM originating from one and the same radar transmitter 11, and in estimating the geographical position thereof. If appropriate, if the radar transmitter 11 is in motion, the successive locations will be filtered by a trajectory estimator.

The first step Stp1 of the method according to the invention consists in intercepting the transmission lobes of the radars 11 of the environment of the ESM stations 10. Each ESM station intercepts the radar transmissions of its surveillance field over one and the same time window. A lobes deinterleaving algorithm makes it possible to separate the pulses of each transmission and therefore to characterize the interception carried out on each lobe. Thus if several transmissions are simultaneously present they will be separated by the deinterleaving.

The extraction function produces blips representing each transmission. Each blip describes the sequence of pulses that it represents by sets of values corresponding to the measurements of certain parameters, including among them; the nominal frequency or frequencies, the pulse repetition period or periods (PRI), the pulse width or widths (PW), the angle or angles of arrival (AOA) and the lobe transit time (LTT). To this list of measurable parameters is also added a set of qualitative parameters characterizing the information summaries.

The lobe transit time can be obtained by various interpolation methods such as for example a parabolic regression scheme. This interpolation makes it possible to estimate the precise time at which the level of the lobe is a maximum.

Thus, on completion of step Stp2, a doublet (AOA, LTT) and a synopsis of the characteristics of the waveform for each intercepted lobe is available in each ESM station 10.

Once these parameters have been obtained a local tracking algorithm makes it possible to inter-associate over time the various transmission lobes in the course of a step Stp3. This step is carried out within each ESM station 10. The objective of the processing is to deinterleave the various transmission lobes, doing so as rapidly as possible. This processing then delivers a sequence of lobes for each transmission and allows the enumeration of the radars present in the surveillance zone of the ESM station. To associate the lobes by transmission, the algorithm can make joint use of the description of the waveform (list of PRIs, frequencies, etc.), the angle of arrival measurements and the lobe transit times.

According to a wholly non-limiting exemplary implementation, this ESM single-platform association step can be carried out over a time of 30 s. Of course, this time can be adjustable according to the type of radar observed.

A key factor involved in the location of radar transmitters is their antenna rotation period. These ARPs, which are noisy, are rarely perfectly fixed, generally they fluctuate. This fluctuation can be greatly reduced by integrating the lobe transit times. Accordingly a sequence of a certain (odd) number of estimation of the LTT is considered. It can be mathematically proven that the best estimation of the lobe transit time, that is to say the estimation with the lowest variance, is obtained by considering the lobe transit time situated in the middle of the sequence. Subsequently this integrated transit time, obtained by temporal regression, will be denoted LTTi. The filtered ARP can also be obtained by this regression processing by considering the slope of the straight line obtained.

Likewise each angle of arrival measurement is noisy. This noise can be reduced by integrating the angle of arrival measurements over several transits of lobes or by angular regression to obtain a mean angle of arrival AOAi.

A doublet of integrated measurements (AOAi, LTTi) is therefore available for each ESM station 10 and for each lobe transit sequence.

According to a mode of implementation of the method, the number of transits of lobes over which the ESM station integrates the measurements can be fixed by the operator according to the type of radar observed.

At the level of each ESM station 10, ESM synopses are therefore available on completion of the local tracking. The ESM stations "ideally" deliver a synopsis R per radar transmission. This synopsis R summarizes the sequence of the lobes perceived for a transmission, and can comprise non-exhaustively:

The label of the local ESM track
A temporal synopsis:
  The time of the first and of the last lobe, the number (odd) of lobes;
  The integrated ARP with its fluctuation, thereby making it possible to know whether the ARP can be considered to be constant and therefore to know whether the scheme according to the invention is applicable;
  The time of the mid-lobe and its uncertainty;
A synopsis of the waveform
  The list of PRIs used (or the histogram);
  The list of Frequencies used (or the histogram);
  Other relevant parameters (Intrapulse, Polarization, identification etc.);
An AOA-based synopsis (mean AOA and AOA-based speed) at the mid-time and the associated uncertainty
The geographical positions and the orientations of the ESM stations are moreover available. In the case of mobile stations, these parameters can be provided by the navigation instruments at the instants of the measurements.

Once the synopses R of the transmission lobes have been determined, each ESM station 10 sends these synopses to a computation module 75 in the course of a step Stp5. This computation module can be located within one of the ESM stations 10 of the detection system or within a dedicated station 77 or master station.

In certain cases, the estimation of the characteristics of the transmission lobe is carried out instantaneously over a single lobe transit. This type of typical case may be encountered with a transmitter 11 possessing a fairly high ARP or for example with a radar transmitter 11 onboard a carrier moving at high speed such as for example an airplane. In this case, the doublets (AOA, LTT) are not integrated and the synopses of measurements comprise their raw values.

The following step, Stp 6, of global tracking consists in associating the local tracks, worked out within each ESM station 10, originating from one and the same radar transmitter 11. It consists in associating over time the synopses R, of one and the same transmission originating from the various ESM stations. This global tracking is carried out within the computation module 75. This association is difficult since several similar and colocated transmissions are present simultaneously.

If the label of the local ESM track has already been associated in the past the operation consists of an updating of the track characteristics, and a verification of the relevance of the association decided beforehand.

For the untracked labels, a tree of multi-hypothesis tracks or tree of hypotheses is established. Accordingly a tracking algorithm dubbed MHT for Multi-Hypothesis Tracking is called upon. The operation consists in testing virtually the whole set of possible grouping solutions.

One of the cornerstones of this algorithm is to measure the likelihood that an N-tuple of synopses originates from one and the same transmitter 11. The hypothesis is made that the stations detect all the lobes. The setup of the hypothesis solutions will consequently show only hypotheses involving the ESM stations of the detection system.

Before constructing the hypothesis tree, a first pruning is performed using the local tracking. We start from the hypothesis that none of the ESM stations 10 has mixed the transmissions originating from different transmitters. Synopses originating from the same ESM station 10 therefore cannot be associated together; these synopses are therefore placed in separate nodes.

Figure 5:
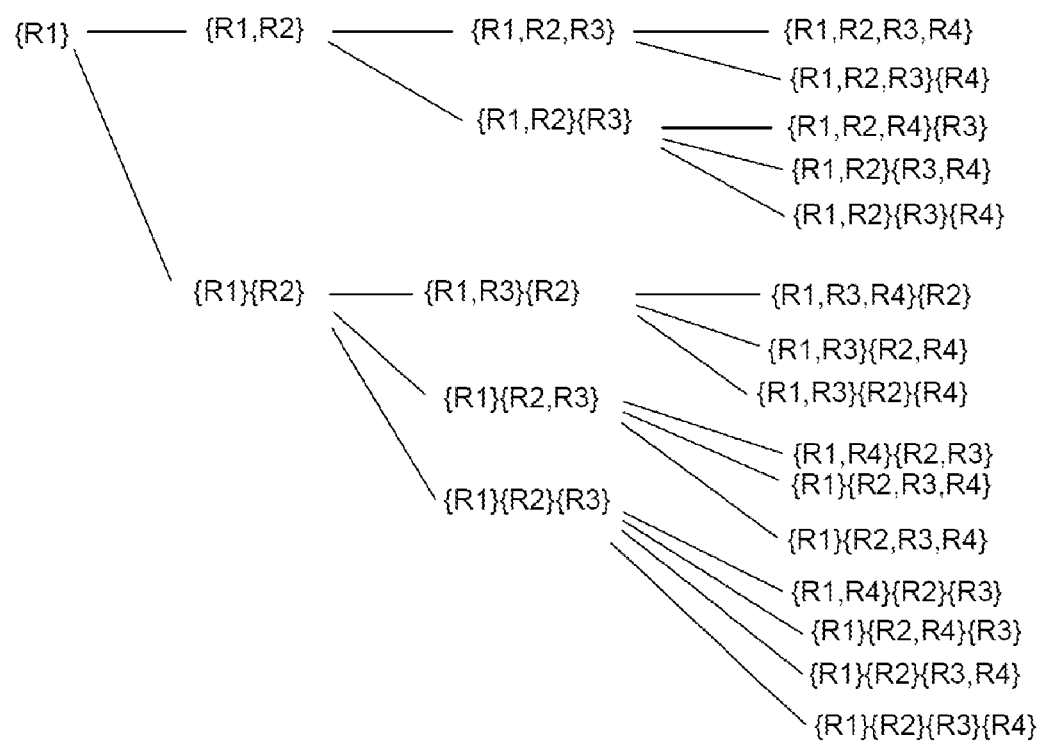
FIG. 5 represents an exemplary multi-hypothesis tree representation according to the invention.

By way of wholly non-limiting illustration, a node of a multi-hypothesis tree is represented in FIG. 5. In this example a synopsis 4-tuple (R1, R2, R3, R4) has been considered. It is also assumed that in this 4-tuple, the synopsis R1 originates from an ESM station and that the synopses R2, R3 and R4 originate from one or more stations different from it.

The synopsis R1 is considered. On the basis of this synopsis, two first hypotheses are constructed, either R1 and R2 originate from the same transmission, or they originate from separate transmissions. With reference to FIG. 5, a grouping of synopses signifies that the synopses concerned, and only these, are considered to originate from one and the same given radar.

The synopsis R3 is thereafter considered and on the basis of the above two potential hypotheses, five new hypotheses are constructed by associating or not this synopsis R3 with a transmission hypothesis. The same operation is performed thereafter with the synopsis R4.

The multi-hypothesis tracking algorithm is activated in a sequential manner in tandem with the arrival of the new synopses. When the computation module receives the synopsis N-tuple, the algorithm envisages all the "admissible" partitions of these synopses as sets of groupings. Such a partition will subsequently be called the global hypothesis.

As soon as the hypothesis tree comprises a hybrid hypothesis, that is to say as soon as the hypothesis is made that at least two synopses originate from the same transmitter, the system begins to test the likelihood of the hypothesis. Certain pruning constraints are imposed on the algorithm so as to reduce the computation times. For example, one chooses not to validate an association if the ARPs are not mutually compatible, that is to say non-similar, if the waveforms are incompatible or if the angles of arrival are incompatible. This makes it possible, without doing any computation, to test the incompatibility of certain hypotheses of the tree. Subsequently, the hypotheses remaining after this pruning will be called "terminal hypotheses".

Once this second pruning has been performed, the likelihood of each terminal hypothesis is computed. As seen previously, the synopses associated with the hypotheses are measurements of waveform, of scan (ARP) and the integrated doublet (AOAi, LTTDi). The likelihood based around the angle of the scan (ARP notably) and of the waveform (PRI and frequencies mainly) consists in measuring the statistical distance between the values of the various synopses. The likelihood based around the angle of the LTTD and AOA joint location consists in verifying that the position estimated for this hypothesis is that for which the theoretical values of the observed parameters are closest (in the sense of a quadratic distance in the Gaussian case) to the measurements performed. Location therefore amounts to searching for the maximum of the likelihood function over the set of possible positions. The maximum attained is the likelihood value sought which validates or invalidates the current hypothesis.

The likelihood is a quantity which will be threshold. If the likelihood value is greater than a certain threshold, the hypothesis is validated signifying that the synopses originate from one and the same transmitter 11. According to an exemplary implementation this threshold can be fixed on the basis of a Chi-2 law under the hypothesis of Gaussian type measurement errors. The size of the tree of hypotheses is reduced in tandem with the validation of the hypotheses by removing the data which have been associated and in parallel a new global track is created which contains the data of the synopses.

When the tracks are created they are followed by a "conventional" tracking algorithm and the future synopses tied therewith are associated directly without entering the tree of hypotheses. The location is then updated directly.

Figures 6A, 6B:
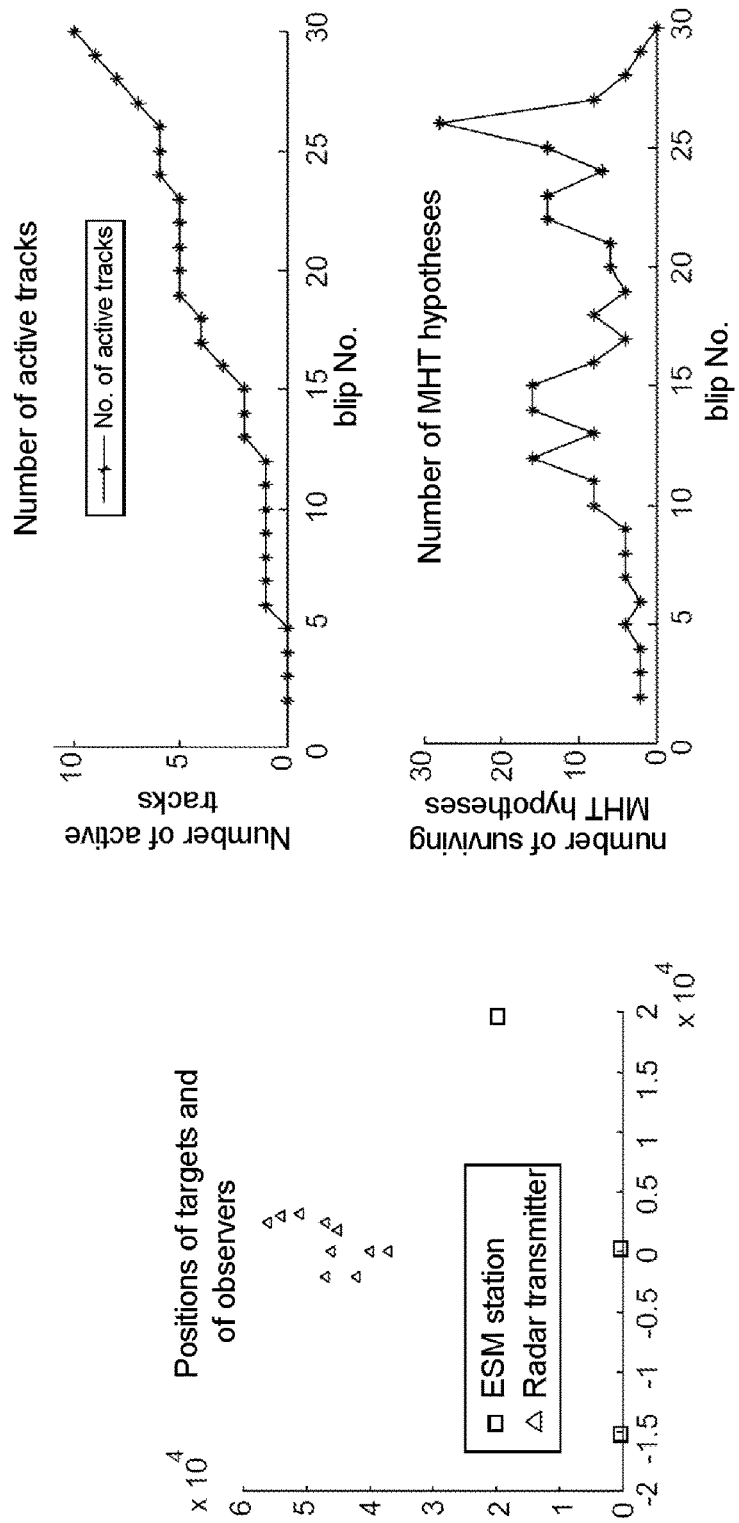
FIGS. 6a and 6b represent an illustration of results obtained by the method according to the invention.

FIGS. 6a and 6b illustrate an exemplary result obtained by applying the method according to the invention.

Represented in FIG. 6a are the positions of the ESM stations 10 and of the transmitters 11 to be located in a Cartesian frame. In the proposed example, the detection system comprises three ESM stations 11 and ten radar transmitters are distributed in space. Five out of the ten radar transmitters possess identical ARPs.

In order to highlight the effectiveness of the method according to the invention, FIG. 6b represents superimposed the evolution of the number of hypotheses and the evolution of the number of active tracks as a function of the number of radar blip. It is noted that the number of hypotheses fluctuates as the algorithm discovers the hypotheses and the tracks. From the $26^{th}$ blip onwards, the curve decreases down to zero. After the $30^{th}$ blip, the algorithm has terminated; it has found all the transmitters. In parallel it may be noted that the number of active tracks increases progressively as the algorithm identifies the transmitters.

According to another mode of implementation, the association is performed by a generalized correlation scheme. In contradistinction to the scheme presented previously, the ESM stations 10 separate the various transmission lobes received but do not perform any local tracking and send all the synopses to the computation module 75. The computation module, after receiving the data from the various ESM stations 10, performs a correlation of these data. The computation module will correlate all the lobes sent by all the stations 10 in 2-Dimensions and will search for the sites where "LTTD peaks" and "ARP peaks" occur between the data of the stations. These joint LTTD and ARP peaks will thus provide the association of the lobes on each of the ESM stations 10. This more expensive scheme in terms of computation time has the advantage of being optimal.

According to another mode of implementation of the method according to the invention, the association of the tracks is carried out by an optimal assignment scheme, of SD assignment type. In this case, the set of synopses Ri received from each ESM station 10 over a predefined duration are processed simultaneously and not sequentially as in the MHT tracking scheme described previously. A cost function, constructed on the basis of the expression for the likelihood, is evaluated for each hypothesis of association of synopses. Subsequently these hypotheses will be named elementary hypotheses.

In the particular case of two ESM stations (2D assignment), which would each have sent N synopses, the cost computation is done for $N^2$ elementary hypotheses. For the pairs for which it is known, without fine evaluation of the cost (for example by pruning while taking account of the ARP), that they are incompatible, the cost will be set to a default value which prevents the production of a result in which these prohibited pairs would occur. Thereafter, the SD assignment algorithm consists in solving the following problem: find the association sequence which minimizes the global cost, this global cost being defined as the sum of the costs of the elementary hypotheses, under a certain number of constraints. These constraints may be, for example, a synopsis arising from an ESM station can be paired with only a single synopsis arising from a different ESM station or a synopsis arising from an ESM station cannot be associated with a synopsis of the same ESM station etc. This algorithm may optionally take into account the possibility of not finding any match corresponding to certain synopses, in the case where the ESM stations would not all have detected the corresponding transmissions.

According to a mode of implementation of the invention, the method can possess a degraded mode. Thus if none of the ESM stations 10 can deliver an angle of arrival, the method can operate according to an "LTTD" only mode. Likewise, for example if the system according to the invention detects a radar not having a constant ARP, the system has the possibility of not implementing the method according to the invention but for example an "AOA" only mode. In both cases the association is greatly facilitated since numerous joint LTTD and AOA based associations have already been carried out on the other transmitters, thereby drastically reducing the association problem.

Figure 7:
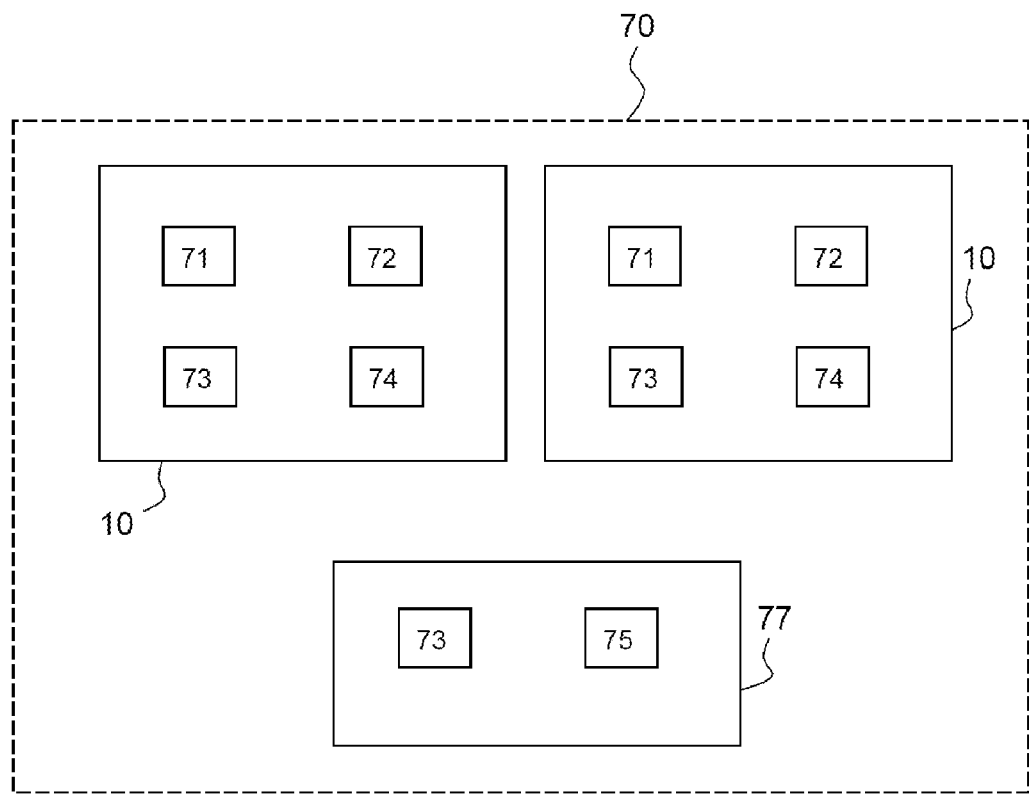
FIG. 7 represents an exemplary embodiment of a detection and location system according to the invention.

FIG. 7 represents in a schematic manner an exemplary embodiment of a detection and location system 70 according to the invention. The system 70 according to the invention comprises at least two ESM stations 10 and a computer 75. The ESM stations 10 can be fixed or mobile. They can be carried on land, sea or airborne vehicles such as for example drones, airplanes or helicopters.

According to an embodiment, the computer 75 is situated in one of the ESM stations of the system. According to another embodiment the computer 75 is situated in a dedicated station 77.

Each ESM station 10 possesses at least one ESM passive sensor and a reception module 71 able to compute the transmission lobe transit time of one or more radar beams. At least one reception module 71 of the ESM stations 10 of the system is able to compute the angle of arrival of the transmission lobe.

Each station 10 of the system possesses a local tracking module 72 able to associate the blips of one and the same transmitter 10 over time.

Each ESM station 10 of the system possesses a communication module able to communicate with the computer 75.

Each ESM station 10 of the system possesses a synchronization module 74. The main function of the synchronization module 74 is to make it possible to date the various events with respect to a time-base common to all the ESM stations 10 and thus to inter-coordinate their operations as a function of time. The synchronization modules 74 can for example synchronize themselves with the geolocation satellites. According to an embodiment, the synchronization is obtained by virtue of a GPS receiver. The temporal synchronization requirement being of the order of about 10 µs, an inexpensive standard geolocation receiver can be used.

In the case of fixed ESM stations 10 the positions and harmonizations can be obtained by an inexpensive calibration procedure.

The present invention may find an application in numerous sectors either on land, at sea, or in the air. In a maritime context, the invention can for example find an application in coastal surveillance from ESM stations. Indeed, the navigation radars in the maritime sector (DECCA) exhibit the particular feature of having a constant antenna rotation period.

Within the framework of a terrestrial application may be cited for example the surveillance of certain zones by a swarm of drones furnished with passive sensors. According to another example, in the aerial sector the invention can be used for the trajectography of airlifts by a network of ESM stations aboard aircraft or distributed on the ground.

Generally, the present invention may find an application in any environment where quasi-constant scanning radar transmitters operate. This is notably the case for numerous mechanical scanning radars, or else surveillance modes of certain electronic scanning radars. It enables all the fixed or mobile constant scanning radars present in the surveillance field of the ESM stations to be put into in tactical situation (SITAC) very rapidly. This helps to greatly clarify the situation so as to deal thereafter with the non-constant scanning radars.

The invention claimed is:

1. A method of passive location of radar transmitters implemented by at least two so-called ESM Electronic Support Measures stations, said radars having a quasi-constant scanning speed in the course of the transit over the set comprising at least two ESM stations, each of said ESM stations being able to intercept the transmission lobes of radar transmitters and to estimate their lobe transit times (LTT) and at least one station being able to estimate the angle of arrival of said transmission lobes, wherein the location of the radar transmitters is performed by testing the intersection between a Lobe Transit Time iso-Difference curve passing through at least the two ESM stations and a sighting straight line passing through the ESM station having measured the angle of arrival and of azimuth equal to said measured angle of arrival.

2. The method as claimed in claim 1, comprising, for each ESM station:
   a step Stp1 of detecting and tracking lobes of the radar transmitters present in the surveillance field of the ESM station considered,
   a step Stp2 of estimating, for each intercepted lobe, its angle of arrival (AOA), its lobe transit time (LTT) as well as characteristics of its waveform,
   a step Stp3 of local association of the transmission lobes originating from the transmission of the same radar transmitter,
   a step Stp4 of integrating the angles of arrival and lobe transit time of each lobe originating from the transmission of the same radar transmitter and of forming a synopsis of measurements (Ri) of each radar transmitter,
   a step Stp5 of sending the synopses of measurements (Ri) of each radar transmitter to a computation module;
   and further comprising a global tracking step Stp6 implemented by the computation module, said global tracking consisting in associating the integrated doublets (AOAi, LTTi) originating from one and the same transmitter by using a multi-hypothesis tree, each hypothesis being tested by a likelihood computation, and in geographically locating said radar transmitter.

3. The method as claimed in claim 2, wherein step Stp6 further comprises a filtering of the hypotheses by constraints consisting in eliminating hypotheses of association of synopses that are incompatible.

4. The method as claimed in claim 1, comprising, for each ESM station:
   a step of receiving and separating the transmission lobes of the radars present in the surveillance field of the ESM station considered;
   a step of sending the data to a computation module;
   and further comprising a step of 2-Dimensional correlation of the data of all the ESM stations.

5. The method as claimed in claim 2, wherein step Stp6 is not carried out with a multi-hypothesis tree but by implementing a global assignment scheme of SD type.

6. A detection and location system able to implement the method as claimed in claim 1, comprising at least two ESM stations and a computation module, each ESM station comprising a reception module able to estimate the lobe transit time of at least one transmitter, a local tracking module, a communication module able to communicate with at least the other ESM stations and a synchronization module able to coordinate the operations of the various ESM stations of the system, the reception module of at least one ESM station being able to estimate the angle of arrival of the transmission lobe of at least one transmitter.

7. The system as claimed in claim 6, further comprising a dedicated station comprising a communication module able to communicate with the communication modules of the ESM stations and wherein the computation module is situated in said dedicated station.

8. The system as claimed in claim 6, wherein the computation module is situated in one of the ESM stations of the system.

9. The system as claimed in claim 6, wherein the synchronization module comprises a satellite geolocation receiver.

* * * * *